United States Patent [19]

Akata

[11] Patent Number: 5,130,975
[45] Date of Patent: Jul. 14, 1992

[54] DUAL PORT MEMORY BUFFERS AND A TIME SLOT SCHEDULER FOR AN ATM SPACE DIVISION SWITCHING SYSTEM

[75] Inventor: Masao Akata, Tokyo, Japan
[73] Assignee: NEC Corporation, Tokyo, Japan
[21] Appl. No.: 624,556
[22] Filed: Dec. 10, 1990

[30] Foreign Application Priority Data

Dec. 15, 1989 [JP] Japan .................. 1-326895

[51] Int. Cl.⁵ .......................................... H04Q 11/04
[52] U.S. Cl. ..................................... 370/60; 370/94.1
[58] Field of Search ............... 370/58.1, 60, 63, 65.5, 370/85.2, 91, 94.1, 59

[56] References Cited

U.S. PATENT DOCUMENTS

| | | | |
|---|---|---|---|
| 4,162,375 | 7/1979 | Schlichte | 370/59 |
| 4,320,501 | 3/1982 | Le Dieu et al. | 370/63 |
| 4,780,870 | 10/1988 | McHarg et al. | 370/85.15 |
| 4,817,083 | 3/1989 | Richards | 370/59 |
| 5,040,174 | 8/1991 | Takeuchi et al. | 370/60 |

OTHER PUBLICATIONS

Hitoshi Uematsu, Haruhiko Matsunaga and Hitoshi Obara, "A Cell-Based Cross-Connect Switch for ATM Broad Band Network," Proceedings of the 1989 Singapore International Conference on Networks (Jul. 1989): 371-376.

Hitoshi Obara and Tetsujiro Yasushi, "High Speed Transport Processor for Broad-Band Burst Transport System," Proceedings of the 1988 International Conference on Communications (Jul. 1989): 922-927.

*Primary Examiner*—Benedict V. Safourek
*Assistant Examiner*—Shick Hom
*Attorney, Agent, or Firm*—Helfgott & Karas

[57] ABSTRACT

An asynchronous transfer mode switching network system relays packets stored in packet buffer units to output ports designated by the packets, and a time slot scheduling unit assigns time slots to the packets stored in the packet buffer units upon arrival at the packet buffer units for preventing the packets from collision in a space division switching unit, wherein each of the packet buffer units sequentially writes new packets into respective memory locations but randomly reads out the new packets in the time slots assigned by the time slot scheduling unit so that the throughput of the space division switching unit is improved.

13 Claims, 10 Drawing Sheets

DUAL PORT MEMORY BUFFERS AND A TIME SLOT SCHEDULER FOR AN ATM SPACE DIVISION SWITCHING SYSTEM

FIELD OF THE INVENTION

This invention relates to an asynchronous transfer mode packet switching network system and, more particularly, to a time slot scheduling unit incorporated in the asynchronous transfer mode packet switching network system for improving the throughput of packets.

DESCRIPTION OF THE RELATED ART

Figure 1:
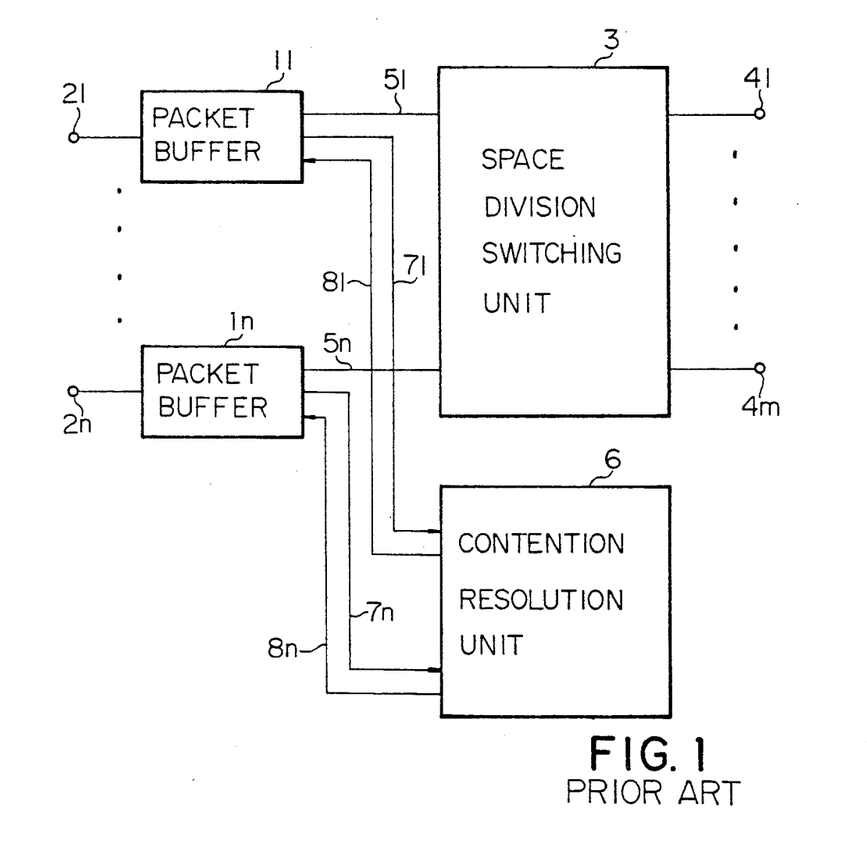
FIG. 1 is a block diagram showing the arrangement of a prior art asynchronous transfer mode switching network system.

An asynchronous transfer mode packet switching network system is attractive to a data communication established for various kinds of digital data such as, for example, digital voice data as well as digital visual data. The asynchronous transfer mode packet switching network system needs to prevent packets from collision and is usually equipped with packet buffers. Various network systems have been proposed and are classified by location of the packet buffers. In view of large-scale high-speed data communication, it is desirable for the asynchronous transfer mode packet switching network to provide the packet buffers in front of the space division switching unit. FIG. 1 shows a typical example of the asynchronous transfer mode packet switching network of the type equipped with the packet buffers located in front of the space division switching unit.

Referring to FIG. 1 of the drawings, packet buffers 11 to 1n are, respectively, assigned input ports 21 to 2n, and a series of packets form a queue in each of the packet buffers 11 to 1n. The packet buffers 11 to 1n are coupled in parallel to a space division switching unit 3, and output ports 41 to 4m are associated with the space division switching unit 3. The packet buffers 11 to 1n behave on the FIFO (First-In First-Out) basis, and the packets each at the head of the queue are supplied from the packet buffers 11 to 1n through respective internal input links 51 to 5n to the space division switching unit 3. The space division switching unit 3 distributes the packets to the output ports 41 to 4m. However, if a plurality of packets are directed to any one of the output ports 41 to 4m, a contention resolution unit 6 prevents the packets from collision.

In detail, each of the packet buffers 11 to 1n communicates with the contention resolution unit 6 prior to the output of the packet at the head of the queue to see whether or not the output of the packet is enabled. For this reason, the packet buffers 11 to 1n are coupled through inquiring signal lines 71 to 7n paired with respective permission signal lines 81 to 8n to the contention resolution unit 6. If a plurality of packets are directed to any one of the output ports 41 to 4m, the contention resolution unit 6 permits one of the packet buffers 11 to 1n to supply the packet at the head of the queue to the space division switching unit 3 in reply to the simultaneous inquiries through the inquiring signal lines 71 to 7n, but the other packet buffer or buffers wait until permissions are received from the contention resolution unit 6.

The space division switching unit 3 is implemented by a non-blocking self-routing switching network such as the Batcher-Banyan switching network, and the contention resolution unit 6 is fabricated by using a self-routing switching network.

However, the prior art asynchronous transfer mode network system thus arranged suffers from a low throughput. This is because of the fact that a packet at the back of a front packet in contention with another front packet is forced to wait even though the designated output port is not busy. In fact, the prior art asynchronous transfer mode network system achieves about 58% throughput in a random arrival represented by such as M/D/1 model. This problem is known as "head of line blocking" phenomenon.

Various solutions have been proposed for the head of line blocking phenomenon, and a sequential arbitration is effective against the head of line blocking phenomenon (see Hitoshi Uematsu, Haruhiko Matsunaga and Hitsohi Obara, "A Cell-based Cross-connect Switch for ATM Broadband Network". Proceedings of the 1989 Singapore International Conference on Networks (July 1989): 371–376). Namely, some of the packets picked up from the head of each queue are sequentially compared with those in another queue and are subjected to arbitration. Such a sequential arbitration easily finds a non-busy output port and allots the non-busy output port to a packet directed thereto. For this reason, the sequential arbitration increases the throughput of the space division switching unit 3 and is carried out prior to the output from the packet buffers 11 to 1n. If internal input links are scheduled on a reservation table together with internal output links, packets are effectively allotted to the nonbusy input and output links. The reservation table is proposed in Hitoshi Obara and Tetsuiiro Yasushi. "High Speed Transport Processor for Broad-band Burst Transport System", Proceedings of the 1988 International Conferences on Communications (July 1988): 922–927.

However, the prior art sequential arbitration can not drastically improve the throughput of the space division switching unit. In fact, the former achieves about 70% throughput, and the latter increases the throughput to about 85%. If packets arrive at the input ports 21 to 2n at a higher rate than the maximum throughput, overflow takes place in the packet buffers 11 to 1n, and, accordingly, some pieces of data information are lost therein. The reason why the throughput is saturated around 70 to 85% is that the contention resolution unit 6 merely arbitrates contentions between the packets at the front positions of the queues. If all of the packets at the front positions are directed to one of the output ports 41 to 4m, the other output ports stand idle even if a packet directed thereto follows the packets at the front positions.

If all of the packets in the packet buffers 11 to 1n are subjected to arbitration, the output ports 41 to 4m may be kept busy at all times, and, therefore, the throughput is drastically improved. However, the asynchronous transfer mode network system needs to achieve a high-speed packet switching for packets each consisting of 53 bytes on a link at 150 Mbps, and, therefore, any technology currently available will hardly arbitrate for all of the packets in the packet buffers.

SUMMARY OF THE INVENTION

It is therefore an important object of the present invention to provide an asynchronous transfer mode switching network system which improves the throughput of a space division switching unit incorporated therein.

To accomplish these objects, the present invention proposes to assign packets in packet buffer units to respective time slots where no contention of destination takes place.

In accordance with the present invention, there is provided an asynchronous transfer mode switching network system comprising: a) a plurality of input ports each supplied with a series of packets, each of the packets having a piece of port address information indicative of a destination; b) a plurality of packet buffer units coupled to the input ports, respectively, each of the packet buffer units having a plurality of memory locations for storing the packets fed from the associated input port, respectively; c) a plurality of output ports each serving as the designation; d) a space division switching unit coupled between the packet buffer units and the output ports and providing a plurality of signal paths each coupling one of the packet buffer units and one of the output ports designated by the piece of port address information incorporated in each packet fed from said one of the packet buffer units; and e) a time slot scheduling unit responsive to a time slot request signal fed from one of the packet buffer units upon arrival of one of the packets at said one of the packet buffer units and supplying said one of the packet buffer units a time slot assigning signal indicative of the amount of time delay from the arrival for designating the earliest time slot where no contention of destination takes place between said one of the packets and the packets fed from the other packet buffer units to the space division switching unit in the earliest time slot, in which said one of the packet buffer units supplies aforesaid one of the packets to the space division switching unit in the earliest time slot.

BRIEF DESCRIPTION OF THE DRAWINGS

The features and advantages of an asynchronous transfer mode switching network system according to the present invention will be more clearly understood from the following description taken in conjunction with the accompanying drawings in which.

DESCRIPTION OF THE PREFERRED EMBODIMENT

General Arrangement

Figure 2:
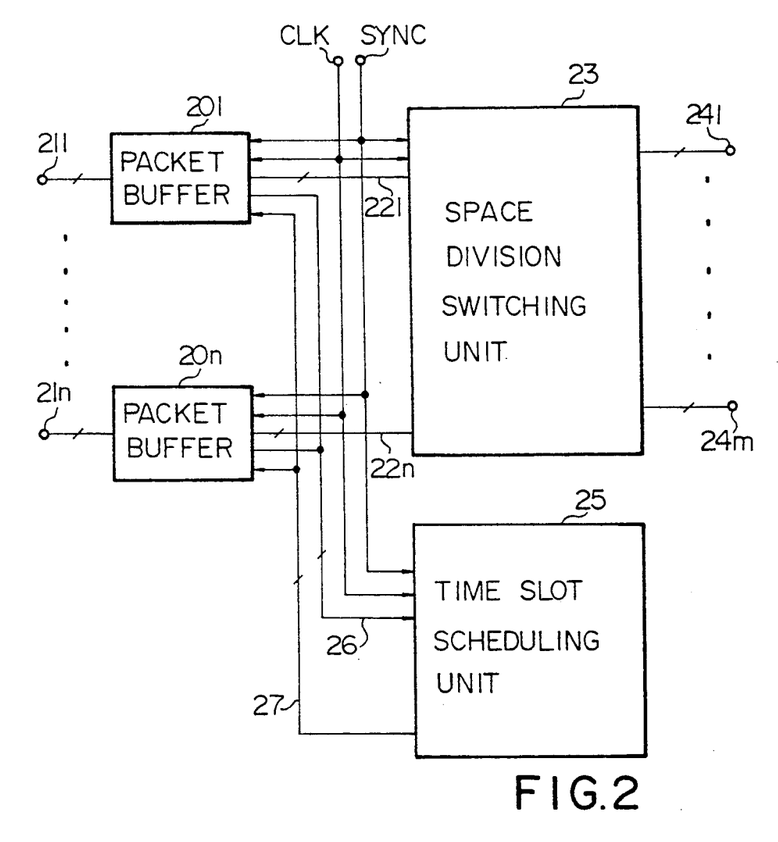
FIG. 2 is a block diagram showing the arrangement of an asynchronous transfer mode switching network system according to the present invention.

Referring to FIG. 2 of the drawings, a plurality of packet buffer units 201 to 20n are coupled in parallel to input ports 211 to 21n, and packets are sequentially supplied from each of the input ports 211 to 21n to the associated packet buffer unit 201, . . . or 20n. The packets thus sequentially fed to each of the packet buffer units 201 to 20n enter in a queue produced therein. The packet buffer units 201 to 20n are coupled through internal input links 221 to 22n to a space division switching unit 23, and a plurality of output ports 24l to 24m are provided in association with the space division switching unit 23. A plurality of component switching elements as many as (n×m) are incorporated in the space division switching unit 23 and are of the self-routing space switch such as, for example, the Batchen-Banyan switch. The packets are supplied from the respective packet buffer units 201 to 20n through the internal input links 221 to 22n to the space division switching unit 23, and the space division switching unit 23 distributes the packets to the output ports 241 to 24m in so far as no contention takes place between the destination or the output port to be directed.

In order to prevent the packets from collision, a time slot scheduling unit 25 is provided in association with the packet buffer units 201 to 20n, and the packet buffer units 201 and 20n and the time slot scheduling unit 25 are coupled through a first multi-bit bus system 26 and a second multi-bit bus system 27. A synchronous signal is supplied through a synchronous signal line SYNC to all of the component units, i.e. the packet buffer units 201 to 20n, the space division switching unit 23 and the time slot scheduling unit 25, and a system clock signal line CLK propagates a system clock signal to all of the component units 201 to 20n, 23 and 25. The synchronous signal as well as the system clock establish a synchronous control between all of the component units 201 to 20n, 23 and 25.

Figure 3:
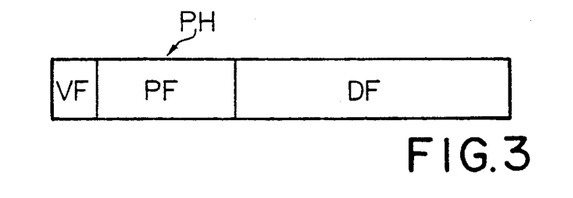
FIG. 3 is a view showing a format of a packet.

The packets are formatted as shown in FIG. 3, and each of the packets has three fields VF, PF and DF. The first field VF contains the most significant bit MSB serving as a flag bit indicative of validity of the packet. The second field PF is assigned address bits indicative of one of the output ports 241 to 24m to which the packet is directed, and the third field DF is provided for data bits indicative of, for example, a piece of voice information, a piece of visual information or a binary number. The first and second fields are hereinbelow called as "packet header PH". Although the packet header PH usually contains address bits indicative of a logical address, a priority bit and so forth, these bits do not directly concern the gist of the present invention, and, for this reason, no further description is incorporated hereinbelow.

Figure 4:
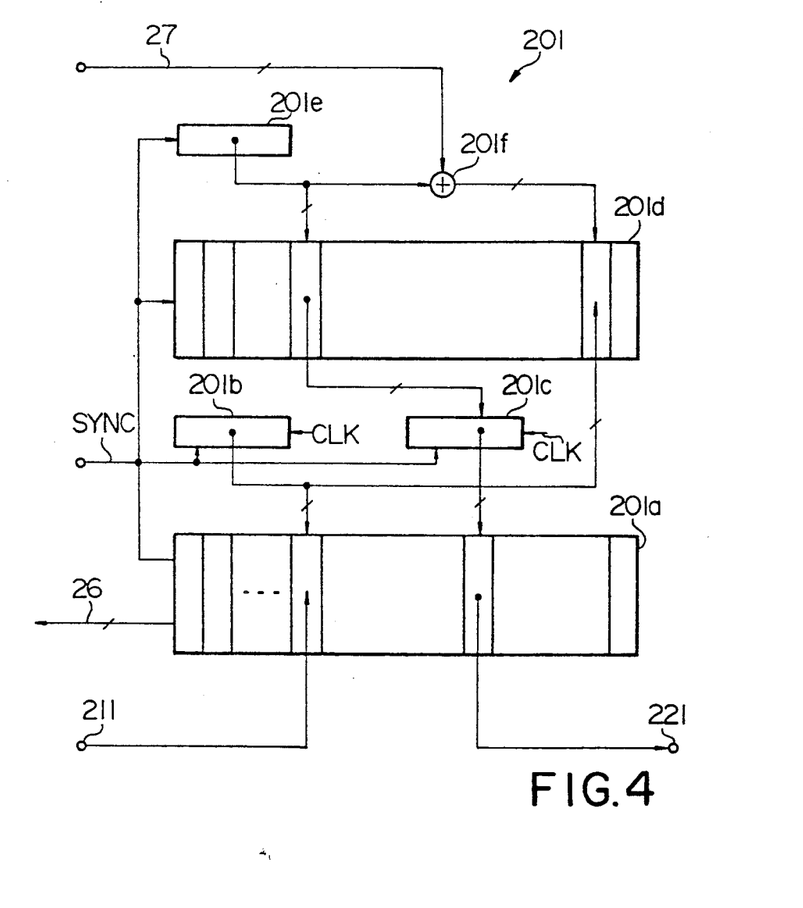
FIG. 4 is a block diagram showing the general arrangement of a packet buffer unit incorporated in the asynchronous transfer mode switching network system of FIG. 2.

The synchronous signal is periodically supplied to the component units 201 to 20n, 23 and 25 and defines a time slot. A series of the time slots are respectively assigned the packet buffer units 201 to 20n, and each of the packet buffer units 201 to 20n sends a time slot request signal through the first bus system 26 upon arrival of a new packet. The multi-bit time slot request signal is representative of the pieces of information memorized in the packet header PH of the new packet, and the time slot scheduling unit 25 provides a time slot assigning signal indicative of the amount of time delay from the present time through the second bus system 27 to the packet buffer unit. The amount of time delay assigns the packet to the earliest time slot which prevents the packet from undesirable collision. With the time slot assigning signal fed from the time slot scheduling unit 25, the packet buffer unit retards the output of the packet until the time slot assigned by the scheduling unit 25 takes place, and, then, sends the packet to the space division switching unit 23. The space division switching unit 23 forms a signal path between the internal input link and one of the output links coupled to the designated output port in accordance with the second field PF incorporated in the packet, and the packet is transferred to the designated output port. Packet Buffer Unit All of the packet buffer units 201 to 20n are similar in the circuit arrangement to one another, and the circuit arrangement of the packet buffer unit 201 is illustrated in FIG. 4. The packet buffer unit 201 largely comprises a packet memory 201a, first and second counter circuits 201b and 201c associated with the packet memory 201a, a control memory 201d, a third counter circuit 201e associated with the control memory 201d, and an adder 201f also associated with the control memory 201d. Packets fed from the input port 211 are sequentially written into the packet memory 201a in accordance with the first counter circuit 201b memorizing a first write-in address sequentially incremented, and the first write-in address causes the packet memory 201a to sequentially store the packets from the leftmost block to the rightmost block by way of example. Each of the blocks of the packet memory 201a stands for a memory location assigned an address, and the address is referred to as "first write-in address" in the write-in operation as well as "first read-out address" in the read-out operation. Only the packet header PH of each packet is transferred to the first bus system 26 upon arrival for requesting the time slot scheduling unit 25 to assign a time slot as described hereinbelow in detail under sub-title "Time Slot Scheduling Unit".

The packets thus sequentially memorized in the packet memory 201a are read out to the internal input link 221 in a random manner in accordance with the second counter circuit 201c memorizing the first read-out address. The first read-out address is supplied from the control memory 201d to the second counter circuit 201c, and the first read-out address addresses any one of the packets stored in the packet memory 201a. The first read-out addresses are memorized in the control memory 201d in a random manner with reference to a second write-in address fed from the adder 201f and sequentially read out from the leftmost block to the rightmost block, by way of example, in accordance with the third counter circuit 201e designating one of the blocks of the control memory 201d. Each of the blocks of the control memory 201d stands for a memory location assigned an address as similar to the packet memory 201a. The address of each block in the control memory 201d is referred to as "second write-in address" in a write-in operation and as "second read-out address" in a read-out operation. The second read-out address is produced by the adder 201f on the basis of the second write-in address in the third counter circuit 201e and the time slot assigning signal indicative of the amount of time delay or the amount of deviation from the second write-in address. The combination of the packet memory 201a and the control memory 201d thus arranged achieves a global arbitration over all the packets memorized in the packet buffer units 201 to 20n, because the time slot scheduling unit 25 takes into account of all of the packets previously supplied to the packet buffer units 201 to 20n before determination of the amount of time delay or the amount of deviation.

Figure 5:
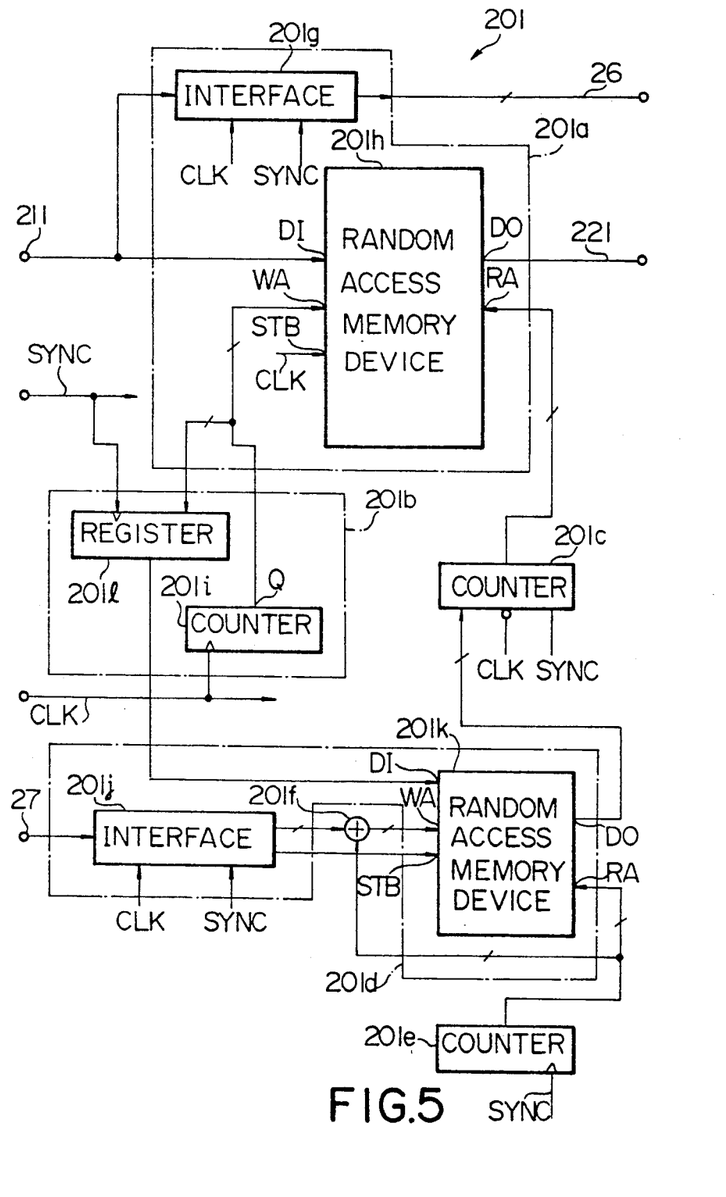
FIG. 5 is a block diagram showing the detailed circuit arrangement of the packet buffer unit.

The packet memory 201a, the control memory 201d and the counter circuits 201b, 201c and 201e are fabricated as shown in FIG. 5. The packet memory 201a has an interface 201g coupled between the associated input port 211 and the first bus system 26, and a dual port random to the associated input port 211. A dual port RAM is known as a RAM with two sets of ports, and data bits are written into and read out from one of the two sets of ports. The data input port DI is associated with a write-in address port WA, and the write-in address port WA is coupled to a counter 201i of the first counter circuit 201b. The dual port random access memory device 201h further has a data output port DO associated with a read-out address port RA, and a strobe port STB supplied with the system clock signal. The readout address port RA is coupled to the second counter circuit 201c, and the random access memory device 201h simultaneously carries out the write-in operation and the read-out operation. The interface 201g is responsive to the synchronous signal and supplies the packet header to the first bus system 26 when counting a predetermined number of the system clocks. The interface 201g incorporated in each packet buffer unit is assigned a predetermined number different from the other interfaces, and, for this reason, no collision takes place on the first bus system 26.

The control memory 201d also comprises an interface 201j coupled to the second bus system 27, and a dual port random access memory device 201k which has a data input port DI associated with a write-in address port WA, and the data input port DI is coupled to a register 201l of the first counter circuit 201b which in turn is coupled to the counter 201i. The register 201l is responsive to the synchronous signal and latches the first write-in address therein. Thus, the first write-in address is stored in the register 201l and, then, supplied to the data input port DI of the random access memory device 201k as the first read-out address memorized therein. The third counter circuit 201e keeps the second read-out address which is incremented with the synchronous signal, and, for this reason, the second read-out address allows the random access memory device 201k to sequentially supply the first read-out address to the second counter circuit 201c. The second counter circuit 201c is responsive to the system clock signal and increments the first read-out signal until the synchronous signal allows the next first read-out address to be fed from the next block of the random access memory 201k designated by the third counter circuit 201e. Then, the component bits of one of the packets are successively read out from the block of the random access memory device 201h to the internal input link 221. As described hereinbefore, the first write-in address is memorized in the random access memory device 201k as the first read-out address, and one of the blocks is designated by the adder 201f for the first read-out address fed from the register 201l. Namely, the adder 201f has two input ports one of which is coupled to the third counter 201e and the other of which is coupled to the interface 201j. The interface 201j behaves as similarly to the interface 201g in response to the synchronous signal and the system clock signal so that the time slot assigning signal surely arrives at the designation without any confusion. The interface 201j transfers the time slot assigning signal to one of the input ports of the adder 201f, and the time slot assigning signal is representative of the amount of time delay or the amount of deviation from the second read-out address. The amount of time delay or the amount of deviation is equivalent to a number of the time slots after which the packet should be read out from the random access memory device 201h without any collision. Then, the adder 201f produces the second write-in address through adding the amount of deviation to the second read-out address. Since the third counter circuit 201e allows the first read-out address to be read out from the random access memory device 201k to the second counter circuit 201c when the delay time period is expired, the packet is supplied from the random access memory device 201k to the internal input link 221 in the earliest time slot free from any collision. Since the time slot assigning signal is indicative of the number of time slots between the arrival of a packet at the packet buffer circuit and the delivery of the packet, each of the packet memory 201a and the control memory 201d needs to have the memory locations as many as the time slots between the present time slot and a time slot with the maximum time delay.

Time Slot Scheduling Unit

Figure 6:
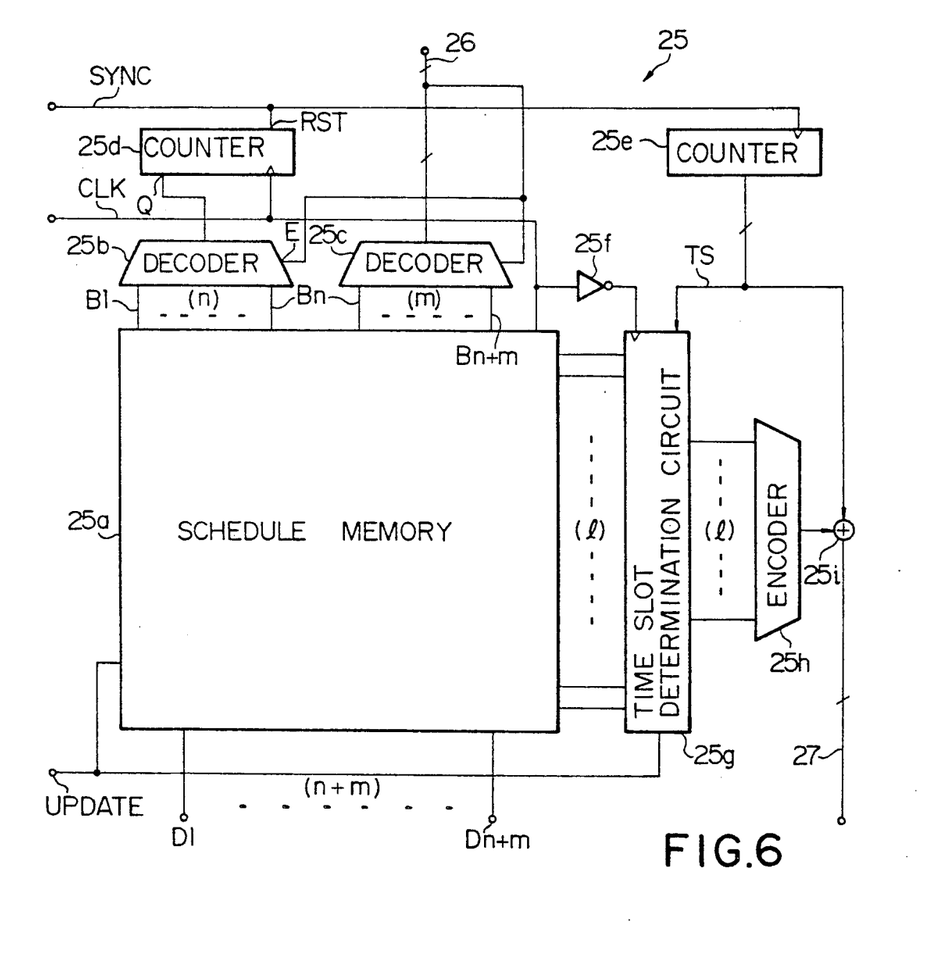
FIG. 6 is a block diagram showing a circuit arrangement of a time slot scheduling unit incorporated in the asynchronous transfer mode switching network system of FIG. 2.

Turning to FIG. 6 of the drawings, the time slot scheduling unit 25 is illustrated in detail. The time slot scheduling unit 25 comprises a schedule memory 25a, decoder circuits 25b and 25c, counter circuits 25d and 25e, an inverter circuit 25f, a time slot determination circuit 25g, an encoder circuit 25h and a subtracter 25i. In this instance, the counter circuit 25d and the decoder circuit 25b as a whole constitute packet buffer identifying means, and the encoder circuit 25h and the subtracter 25i form in combination the time slot assigning means. The counter circuit 25e serves as standard time signal producing means, and the decoder circuit 25c as output port identifying means.

The counter circuit 25d has a reset node RST coupled to the synchronous signal line SYNC and is incremented by the system clock signal. The output signal of the counter circuit 25d is fed from the output port Q thereof to the decoder circuit 25b which produces an input bit-map signal B1 to Bn indicative of one of the packet buffer units 201 to 20n in the presence of the most significant bit MSB of the logic "1" level. Since the packet buffer units sequentially supply the respective time slot request signals to the first bus system 26 in synchronism with the system clock signal the decoder circuit 25b also sequentially designates the packet buffer circuits 201 to 20n, and the decoder circuit 25c produces an output bit-map signal Bn+1 to Bn+m in the presence of the most significant bit MSB of the logic "1" level. For example, if the packet buffer unit 201 receives a packet with the packet header PH designating the output port 241, the decoder circuit 25b produces the input bit-map signal B1 to Bn with bit string of (100 . . . 0), and the decoder circuit 25c decodes the packet header PH producing the output bit-map signal with bit string (100 . . . 0). However, if the most significant bit MSB is the logic "0" level, each of the input bit-map signal and the output bit-map signal has bit string consisting of "0" bits. The input bit-map signal and the output bit-map signal are supplied to the schedule memory 25a and the circuit arrangement of the schedule memory 25a is shown in detail in FIG. 7. The counter circuit 25e is responsive to the synchronous signal which increments the counting value indicative of the present time or the time slot presently produced. The counter value is supplied to the time slot determination circuit 25g and the subtracter 25i, and a standard time signal TS represents the counting value of the counter circuit 25e. However, detailed description is hereinbelow made with reference to FIG. 8.

Figure 7:
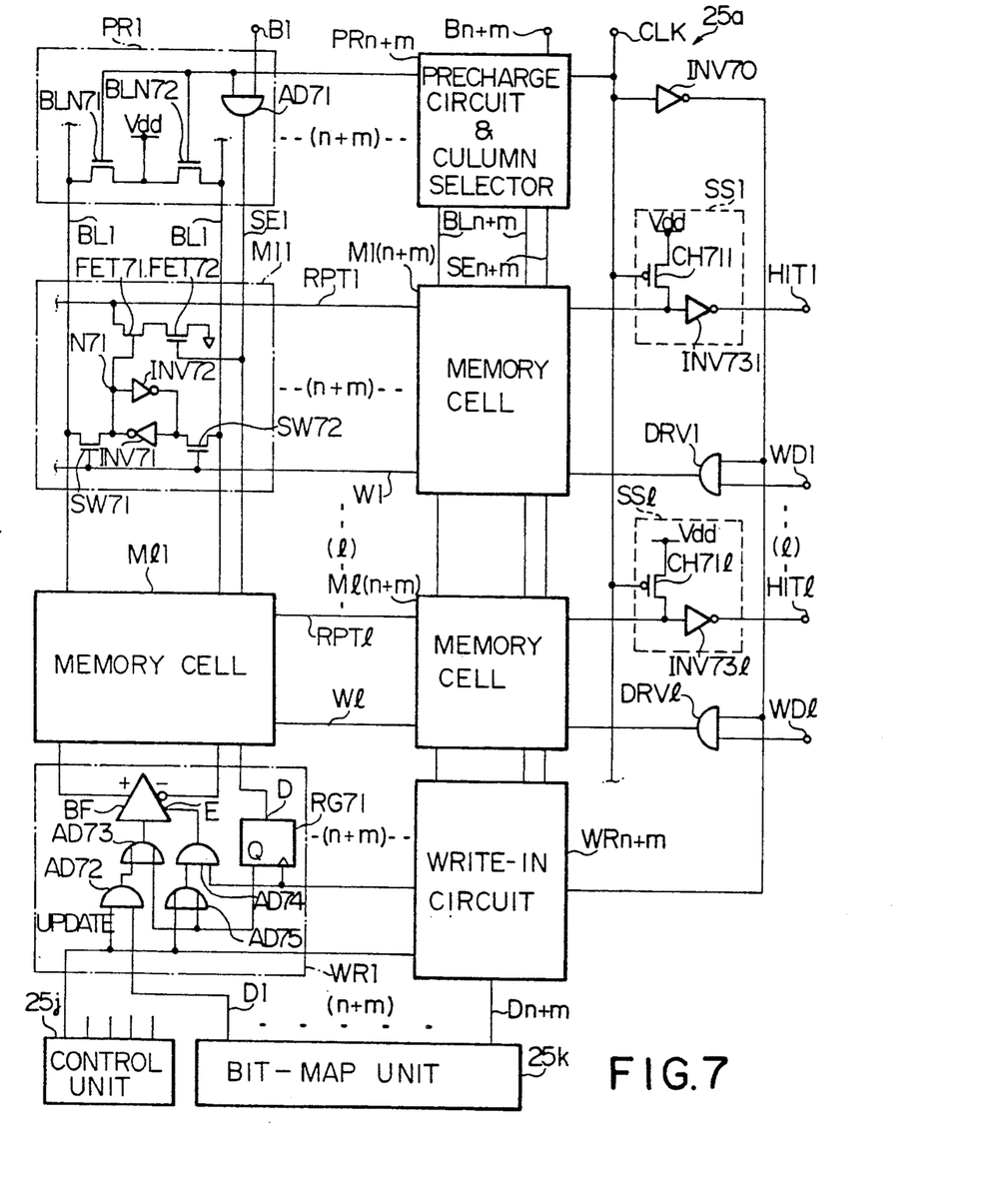
FIG. 7 is a circuit diagram showing the arrangement of a schedule memory incorporated in the time slot scheduling unit.

Turning to FIG. 7 of the drawings, the schedule memory 25a comprises (n+m) memory cells MA1, MA(n+m), ML1 and ML(n+m) arranged in (n+m) rows and L columns, a plurality of bit line pairs BL1 to BL(n+m) coupled to the columns of the memory cells MA1 to MA(n+m), a plurality of combined circuits of precharging circuits and column selectors PR1 to PRn+m coupled to the bit line pairs BL1 to BLn+m, respectively, a plurality of write-in circuits WR1 to WRn+m coupled at the opposite ends to the bit line pairs BL1 to BLn+m, respectively, an inverter circuit INV70 coupled to the system clock signal line CLK producing the complementary system clock signal, L word lines W1 to WL coupled to the rows of the memory cells MA1 to ML(n+m), a plurality of word line driver circuits DRV1 to DRV1, and a plurality of status sensing circuits SS1 to SS1 associated with rows of the memory cells MA1 to ML(n+m). The rows of the memory cells MA1 to ML(n+m) are coupled to respective reporting lines RPT1 to RPTl, and the report lines RPT1 to RPTl propagate data bits respectively memorized in the memory cells to the status sensing circuits SS1 to SSl. Each of the combined circuit of the precharging circuit and the column selector is hereinbelow simply referred to as "combined circuit". All of the memory cells MA1 to ML(n+m) are similar to one another, and the precharging circuit PR1 and the write-in circuit WR1 are respectively similar in circuit arrangement to the other precharging circuits and the other write-in circuits. For this reason, description is made on the precharging circuit PR1, the memory cell MA1 and the write-in circuit WR1 only for avoiding repetition.

The combined circuit PR1 comprises a series of balancing transistors BLN71 and BLN72 coupled between the component bit lines of the associated bit line pair BL1 for equalizing in voltage level therebetween, and an AND gate AD71 for producing a selecting signal in the co-presence of the bit B1 of the logic "1" level and the system clock signal of the logic "1" level. The memory cell MA1 comprises a memory loop of inverter circuits INV71 and INV72, switching transistors SW71 and SW72 coupled between the bit line pair BL1 and the memory loop of the inverter circuits INV71 and INV72 and gated by the word line W1, and a status reporting circuit implemented by a series combination of field effect transistors FET71 and FET72 coupled between the associated reporting line RPT1 and a source of negative voltage level. The field effect transistor FET71 is coupled at the gate electrode thereof to a memory node N71 of the memory loop and turns on in the presence of the logic "1" bit at the memory node N71. The combined circuits PR1 to PRn+m are respectively coupled to column selecting lines SE1 to SEn+m, and the column selecting lines SE1 to SEn+m propagates the selecting signals. The column selecting line SE1 is coupled to the field effect transistor FET72, and, therefore, the field effect transistor FET72 turns on in the presence of the selecting signal on the selecting signal line SE1. The status sensing circuits SSI has a charging transistor CH711 coupled between a source of positive voltage level Vdd and the reporting line RPT1, and an inverter circuit INV731. The charging transistor CH711 is gated by the system clock signal line CLK and charges the reporting line RPT1. If the memory node N71 stores the logic "1" bit, the reporting line RPT1 is discharged through the series combination of the field effect transistors FET71 and FET72 in the presence of the selecting signal on the selecting signal line SE1. However, the logic "0" bit at the memory node N71 allows the reporting line RPT1 to remain the charged state. In this instance, the logic "1" bit at the memory node is representative of a reserved state, and the logic "0" bit of a non-reserved state. As described hereinbefore, when one of the packet buffer units 201 to 20n sends the packet header PH of a packet to the time slot scheduling unit 25, the decoder circuits 25b and 25c produces the input bit-map signal and the output bit-map signal, and those bit map signals respectively have the logic "1" bits indicative of the packet buffer unit and one of the output ports 241 to 24n. The logic "1" bits incorporated in the bit-map signals cause the AND gates of two combined circuits to yield the selecting signals on the selecting lines SE1 to SEn+m in the presence of the system clock signal of the logic "1" level. The reporting line is kept in the precharged state only when the non-reserved state is memorized in both of the memory cells corresponding to the packet buffer unit requesting the time slot and the output port to be designated by the packet header PH. The associated inverter circuit INV731, .... or INV731 produces a hit signal HIT1, ... or HITl of an active logic "0" level on the basis of the reporting line in the charged state. If a combination of a packet buffer unit and an output port is not memorized in more than one rows of the memory cells MA1 to ML(n+m), more than one status sensing circuits SSI to SSI yield the hit signals.

Figure 8:
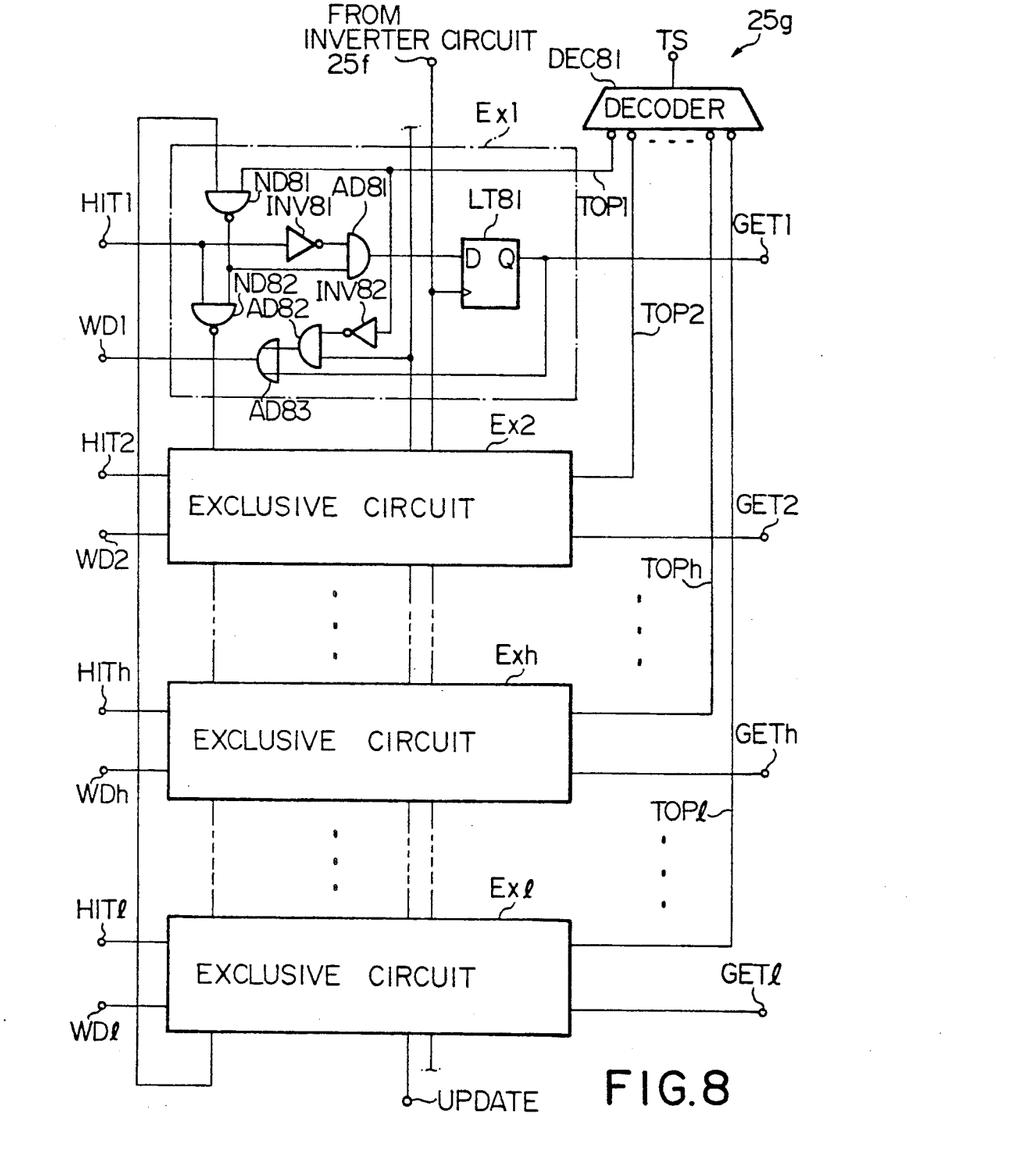
FIG. 8 is a circuit diagram showing the arrangement of a time slot determination circuit incorporated in the time slot scheduling unit.

The hit signal or signals are supplied from the status sensing circuits SSI to SSI to the time slot determination circuit 25g as will be seen from FIG. 6, and detailed description will be hereinlater made on the time slot determination circuit 25g with reference to FIG. 8. The rows of the memory cells MA1 to ML(n+m) respectively correspond to a series of time slots, and more than one high signals mean that more than one time slots are available. However, only one row of the memory cells MA1 to ML(n+m) is activated by the associated word line driving circuit DRV1, . . . or DRVl, and the memory cells in the activated row memorize the reserved state by the write-in circuits associated with the columns corresponding to the packet buffer unit requesting the time slot and the output port designated by the packet header PH. This means that one of the time slot is reserved by a new packet which arrives at the packet buffer unit. The reservation will be hereinafter described in detail.

Turning to FIG. 8 of the drawings, the time slot determination circuit 25g comprises a decoder circuit DEC81, and a plurality of exclusive circuits Ex1, Ex2 . . . , Exh, . . . and Exl. The decoder circuit DEC81 is supplied with the standard time signal TS and designates one of the exclusive circuits Ex1 to Exl with a designating signal TOP1 to TOPl, and one of the bits of the designating signal TOP1 to TOPl goes down to an active logic "0" level for designation.

All of the exclusive circuits Ex1 to Exl are similar in circuit arrangement to one another, and description is made on the exclusive circuit Ex1 only. The exclusive circuit Ex1 comprises two NAND gates ND81 and ND82, two inverter circuits INV81 and INV82, three AND gates AD81, AD82 and AD83, and a latch circuit LT81. The NAND gates ND81 and ND82, the AND gates AD81 to AD83 and the inverter circuits INV81 and INV82 as a whole constitute a control circuit, and the latch circuit LT81 serves as a storage circuit.

Assuming now that the standard time signal TS and, accordingly, the designation signal indicate that the row of the memory cells MA1 to MA(n+m) corresponds to the present time slot, the bit TOP1 is in the active logic "0" level, and the NAND gate ND81 Yields the output signal of the logic "1" level regardless of the other input bit. If the hit signal HIT1 is in the active logic "0" level, the inverter circuit INV81 supplies the output signal of the logic "1" level, and the AND gate AD81 writes a piece of assigning information indicative of the assignment of the packet just requesting to the present time slot. In this situation, the NAND gate ND82 yields the output signal of the logic "0" level, and, for this reason, the other exclusive circuits Ex2 to Exl are never responsive to the hit signals even though the hit signals are in the active logic "0" level. However, if the hit signal HIT1 is in the inactive logic "1" level, the AND gate AD81 does not write the piece of assigning information into the latch circuit LT81, but the NAND gate ND82 supplies the output signal of the logic "1" level to the next exclusive circuit Ex2. If the hit signal HIT2 is in the active low voltage level, the piece of the assigning information is memorized in the exclusive circuit Ex2, and no output signal of the logic "1" level is relayed to the next exclusive circuit. In this way, the chance is sequentially relayed from an exclusive circuit to the next exclusive circuit until the earliest time slot is found. The piece of assigning information thus memorized in any one of the exclusive circuits Ex1 to Exl allows the output signal GET1, GET2, . . . , GETh, . . . or GETl to go to the logic "1" level, but the others remain in the logic "0" level. The output signal of the logic "1" level is encoded by the encoder circuit 25h, and the output signal of the encoder circuit 25h is supplied to the subtracter 25i (see FIG. 6) for producing the time slot assigning signal. The piece of assigning information merely teaches the absolute position of the assigned row, and the subtraction at the subtracter 25i results in a relative position of the assigned row with respect to the row corresponding to the present time slot. For this reason, the time slot assigning signal is indicative of the amount of time delay from the present time or the amount of deviation from the present time slot.

Turing back to FIG. 7 of the drawings, the write-in circuit WR1 comprises a register RG71 coupled to the selecting line SE, four AND gates AD72, AD73, AD74 and AD75 and a write-in buffer circuit BF. The schedule memory 25a is associated with a control unit 25j and a bit map unit 25k. The control unit 25j produces various control signals including an updating signal UPDATE, and the bit map unit provides a bit map signal D1 to Dn+m to the write-in circuits WR1 to WRn+m. The bit map signal D1 to Dn+m generally has a bit string of (0000 . . . 000) but may have another bit string for restricting packets to a particular output port.

The piece of assigning information thus memorized in the latch circuit of one of the exclusive circuits Ex1 to Exl is further used for memorizing the bit combination on the selecting signal lines into one of the rows of the memory cells MA1 to ML(n+m). As described hereinbefore, the piece of assigning information is latched in the exclusive circuit corresponding to the present time slot or the earliest time slot, and description is made on the assumption that the piece of assigning information is memorized in the exclusive circuit Ex1.

When each of the decoder circuits 25b and 25c shifts any one of the bits B1 to Bn or Bn+1 to Bn+m to the logic "1" level, the bits of the logic "1" level cause the AND gates AD71 of one of the combined circuits PR1 to PRn+m to produce the selecting signals of the logic "1" level as described hereinbefore. In the following description, the decoder circuits 25b and 25c are assumed to shift the bits B1 and Bn+m to the logic "1" level. The logic "1" signals on the selecting lines SE1 and SEn+m are memorized in the registers RG71 of the write-in circuits WR1 and WRn+m. After reservation of the memory cell, updating operation is carried out by driving the word line at every clock. However, a rewriting operation is further carried out for a memory cell indicated by one of the bits TOP1 to TOPl in the presence of the updating signal UPDATE in synchronism with the synchronous signal SYNC. If the updating signal UPDATE goes up to the logic "1" level, the output signal of the latch circuit LT81 of the exclusive circuit Ex1 is transferred to the associated one of the rewrite control signal lines WD1, WD2, WDh and WDl in the presence of the bit TOP1 of the active logic "0" level of the designating signal. Then, the output signal of the logic "1" level is supplied from the latch circuit LT81 of the exclusive circuit Ex1 through the AND gate AD83 to the associated rewrite-control line WD1. The rewrite control signal of the logic "1" level causes the associated driver DRV1 to shift the associated word line W1 to an active level, and conduction paths are produced between the bit line pairs BL1 to Bln+m and the memory cells MA1 and MA(n+m) in the presence of the complementary system clock signal of the logic "1" level.

Figure 9A:
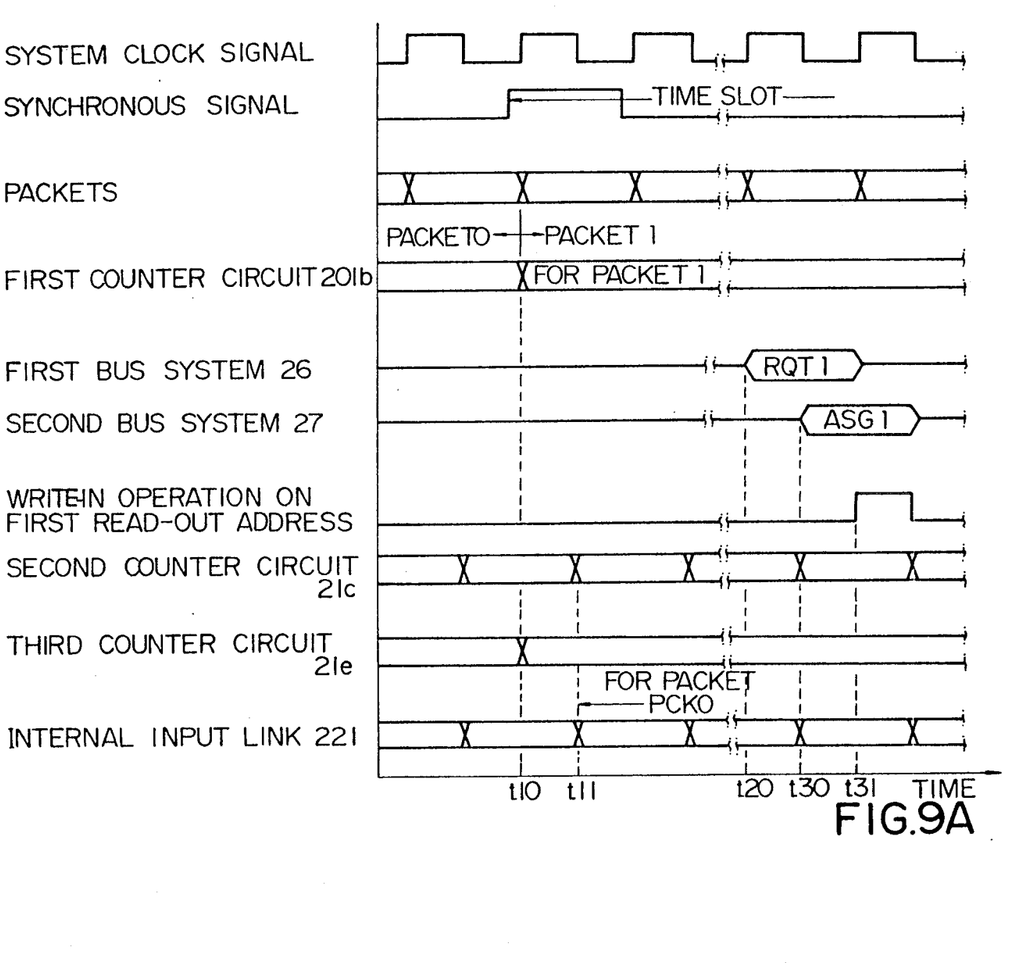
FIGS. 9A and 9B are timing charts showing the global circuit behavior of the asynchronous transfer mode switching system network according to the present invention.

For the sake of simplicity, the bit map signal fed from the bit-map unit 25k is assumed to have the bit string consisting of the logic "1" bits, the AND gates AD72 of the write-in circuits WR1 and WRn+m produce the respective output signals of the logic "1" level in the presence of the updating signal UPDATE of the logic "1" level, and the output signals of the registers RG71 incorporated in the write-in circuits WR1 and WRn+m allow the AND gates AD73 and AD75 to yield the respective output signals of the logic "1" level. Since the AND gates AD74 supply the respective output signals of the logic "1" level to the enable nodes of the write-in buffer circuits BF of the write-in circuits WR1 and WRn+m in the presence of the complementary system clock signal of the logic "1" level, the write-in buffer circuits BF are, then, activated and write the logic "1" bit into the memory nodes N71 of the activated memory cells MA1 and ML(n+m). The piece of assigning information of the bit combination B1 and Bn+m is thus memorized in the memory nodes N71 of the memory cells MA1 and ML(n+m) and is maintained until the decoder circuit DEC81 designates the row of the memory cells M A1 to ML(n+m) again and causes the field effect transistors FET71 to discharge the associated reporting line RPT1. Thus, a series of the bit combinations, each consisting of a bit selected from the input bit map signal B1 to Bn and a bit selected from the output bit map signal, are respectively memorized in the rows of the memory cells MA1 to ML(n+m) by the aid of the time slot determination circuit 25g, and the bit combinations provide the status reporting signals to the time slot determination circuit 25g for assigning a new packet to the earliest time slot. Global Circuit Behavior Turning to FIGS. 9A and 9B of the drawings, the global circuit behavior of the asynchronous transfer mode switching network system shown in FIGS. 2 to 8 is described on the assumption that the packet buffer unit 201 shown in FIGS. 4 and 5 in detail accepts a output port 24i at time t10 wherein "i" is arbitrary number less than "n". Packet PCKO has been output port 24n at time t10. Packet PCK0 has been memorized in the packet memory 201a and is waiting for a time slot SL1 assigned by the time slot scheduling unit 25 as has been described above in connection with FIGS. 4 and 5. The rime slot SL1 starts with the synchronous signal at time t10.

Upon arrival of the packet PCK1 at time t10 (FIG. 9A), the first counter circuit 201b has the first write-in address at the counter 201i, and the register 201l fetches the first write-in address in synchronism with the synchronous signal at time t10. Then, the counter 201i supplies the first write-in address to the write-in address port WA of the random access memory device 201h, and the first write-in address is sequentially incremented by the system clock signal. With the first write-in address thus sequentially incremented, the random access memory device 201h writes the component bits of the first packets PCK1 therein. When the counting operation on the system clock signal is completed by the interface 201g, the time slot request signal RQT1 indicative of the packet header PH1 is supplied to the first bus system 26 at time t20.

Prior to time t20, the packet PCK0 already written in the packet memory 201a is read out from the packet memory 201a to the associated internal input link 221 as shown in FIG. 4. Namely, the second read-out address in the third counter circuit 201e reaches a certain value indicative of the memory location where the first read-out address is memorized at time t10, and the fist read-out address is supplied from the control memory 201d to the second counter circuit 201c at time t11 (FIG. 9). The first read-out address is incremented by the system clock signal, and the component bits of the packet PCK0 is sequentially read out from the random access memory device 201h to the associated internal input link 221, as shown in FIG. 5.

With the time slot request signal RQT1 supplied to the time slot schedule unit 25 at time t20, the decoder circuit 25b shifts the bit B1 to the logic "1" level, and the decoder circuit 25c allows the bit Bn+m to be in the logic "1" level. Then, the column selecting lines SE1 and SEn+m goes to the logic "1" level. All of the status reporting lines RPT1 to RPTl have been already precharged before time t20, and mark (*) stands for the precharging operation. Assuming now that the memory cells MA1 and MA(n+m) do not memorize the data bits of the logic "1" level and are, accordingly, in the non-reserved state. The status sensing circuit SS1 produces the hit signal GET1 at time t21, and the selecting signals on the column selecting lines SE1 and SEn+m are stored in the registers RG71 of the write-in circuits WR1 and WRn+m, respectively. If the standard time signal TS designates the row of the memory cells ML1 to ML(n+m), the bit TOPl is in the logic "0" level, and the inverter circuit INV82 inverts the bit TOPl to the logic "1" level. If the exclusive circuit Exl is not supplied with any hit signal GET1, the exclusive circuit Exl activates the exclusive circuit Ex1 which is associated with the memory cells MA1 to MA(n+m) corresponding to the next time slot SL2. Then, the hit signal GET1 is inverted to the logic "1" level, and the NAND gate ND81 allows the AND gate AD81 to memorize the hit signal in the latch circuit LT81 as the piece of assigning information. The latch circuit LT81 causes the encoder circuit 25 to produce the time slot assigning signal ASG1 indicative of the next time slot SL2 by the aid of the subtracter 25$i$, and the time slot assigning signal ASG1 is supplied to the control memory 201$d$.

The time slot assigning signal ASG1 on the second bus system 27 is latched in the interface 201$j$ at time t30, and the adder 201$f$ retrieves the absolute first write-in address through addition between the time slot assigning signal ASG1 and the second write-in address fed from the third counter circuit 201$e$. With the second write-in address thus retrieved, the random access memory device 201$k$ of the control RAM of the packet buffer unit writes the first write-in address stored in the register 201$l$ and memorizes it as the first read-out address. Though not shown in the drawings, the first read-out address is read out from the random access memory 201$k$ to the second counter circuit 201$c$ in the next time slot SL2 and used for reading-out operation on the packet PCK1 similarly to the packet PCK0.

Figure 9B:
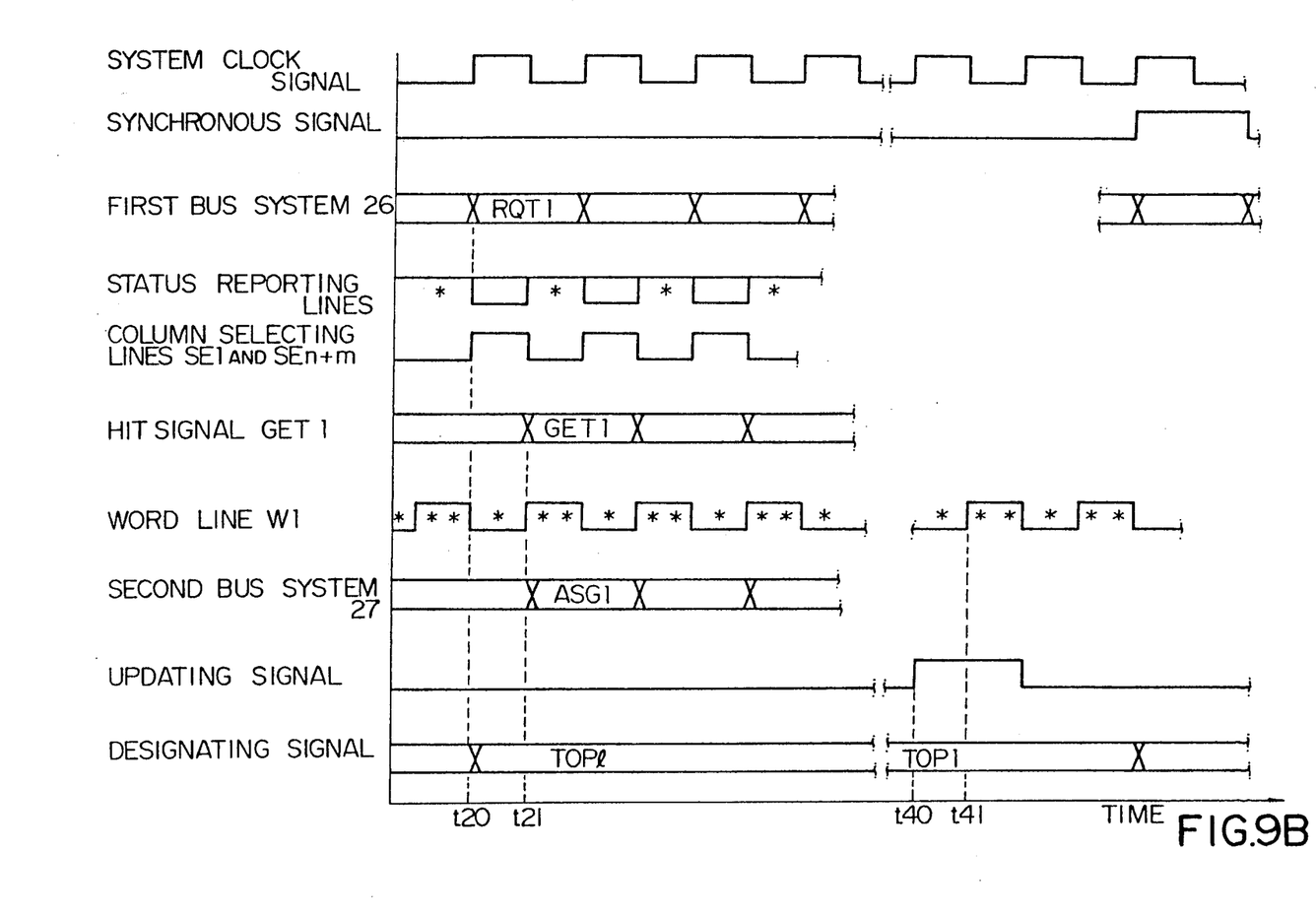

If the updating signal UPDATE goes up to the logic "1" level at time t40 and the decoder circuit DEC81 shifts the bit TOP1 to the active logic "0" level, the piece of assigning information is read out from the latch circuit LT81, and the AND gate AD83 shifts the rewrite control line WD1 to the logic "1" level. The bit line pairs BL1 to BLn+m are precharged at timing indicated in FIG. 9B by (*), and the word line driving circuit DRV1 allows the word line W1 to go up to the logic "1" level in the presence of the rewrite control signal WD1. With the selecting signals already memorized therein, the registers RG71 of the write-in circuits WR1 and WRn+m causes the write-in buffer circuits BF to drive the bit line pairs BL1 and BLn+m, thereby writing the data bits of the logic "1" into the memory cells MA1 and MA(n+m) at time t41. This write-in operation is represented in FIG. 9B by mark (**).

Figure 10:
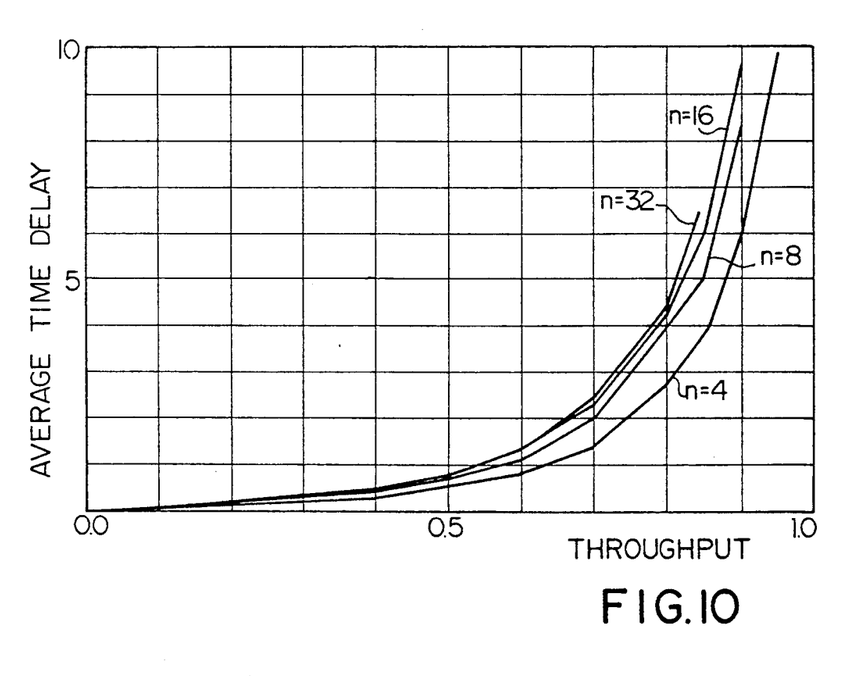
FIG. 10 is a graph showing the throughput of the asynchronous transfer mode switching network system in terms of average time delay.

As will be understood from the foregoing description, the asynchronous transfer mode switching network system according to the present invention assigns all of the packets to the respective time slots upon arrival at the packet buffer units, and this results in improvement of the throughput. In fact, if the asynchronous transfer mode switching network system according to the present invention has n packet buffer units as many as the output ports, the throughput is improved as shown in FIG. 10. Moreover, the asynchronous transfer mode switching network system is implemented by complementary MOS inverters fabricated with 1.0 micron design rule and is well responsive to the system clock signal at 20 MHz.

Although particular embodiments of the present invention have been shown and described, it will be obvious to those skilled in the art that various changes and modifications may be made without departing from the spirit and scope of the present invention.

What is claimed is:

1. An asynchronous transfer mode switching network system comprising:
   (a) a plurality of input ports each supplied with a series of packets, each of said packets having a piece of port address information indicative of a destination;
   (b) a plurality of packet buffer units coupled to said input ports, respectively, each of said packet buffer units having a plurality of memory locations for storing said packets fed from the associated input port, respectively;
   (c) a plurality of output ports each serving as said designation;
   (d) a space division switching unit coupled between said packet buffer units and said output ports and providing a plurality of signal paths each coupling one of said packet buffer units and one of said output ports designated by said piece of port address information incorporated in each packet fed from said one of said packet buffer units; and
   (e) a time slot scheduling unit responsive to a time slot request signal fed from one of said packet buffer units upon arrival of one of said packets at said one of said packet buffer units and supplying said one of said packet buffer units with a time slot assigning signal indicative of the amount of time delay from said arrival for designating the earliest time slot where no contention of destination takes place between said one of said packets and packets fed from the other packet buffer units to said space division switching unit in said earliest time slot, in which said one of said packet buffer units supplies said one of said packets to said space division switching unit in said earliest time slot.

2. An asynchronous transfer mode switching network system as set forth in claim 1, in which each of said packet buffer units comprises
   (b-1) a first counter circuit for producing a first write-in address sequentially incremented,
   (b-2) a packet memory having said plurality of memory locations sequentially designated by said first write-in address for storing said packet therein,
   (b-3) a second counter circuit storing a first read-out address for randomly designating one of said memory locations of said packet memory,
   (b-4) a third counter circuit storing a second read-out address sequentially incremented,
   (b-5) address producing means for producing a second write-in address on the basis of said second read-out address and said time slot assigning signal, said amount of time delay being equivalent to the amount of deviation from said second read-out address, and
   (b-6) a control memory having a plurality of memory locations and supplied with said first write-in address for storing as said first read-out address in one of said memory locations designated by said write-in address, said first read-out address being supplied from the memory location of said control memory to said second counter circuit when said second read-out address designates said memory location.

3. An asynchronous transfer mode switching network system as set forth in claim 2, in which said address producing means are implemented by an adder with two input ports supplied with said second read-out address and said time slot assigning signal.

4. An asynchronous transfer mode switching network system as set forth in claim 1, in which said time slot scheduling unit comprises
   (e-1) packet buffer identifying means for producing a first identifying signal indicative of said one of said packet buffer units sending said time slot request signal, (e-2) output port identifying means for producing a second identifying signal indicative of one of said output ports to which said one of said packets is directed, (e-3) a schedule memory having a plurality of memory locations respectively corresponding to a series of time slots and memorizing pieces of combinatorial information each indicative of a combination of any one of said packet buffer units and any one of said output ports reserved by a packet previously supplied to any one of said packet buffer units, said schedule memory producing a hit signal or signals each indicative of that said memory location does not memorize a piece of combinatorial information indicative of at least said one of said packet buffer units or said one of said output ports, (e-4) standard time signal producing means for producing a standard time signal indicative of a present time slot selected from said series of time slots, (e-5) a time slot determination circuit supplied with said hit signal or signals and assigning said one of said packets to said present time slot in so far as said memory location corresponding to said present time slot is indicated by said hit signal, said time slot determination circuit assigning said one of said packet to the earliest time slot with respect to said present time slot in so far as said memory location corresponding to said earliest time slot is indicated by said hit signal upon determination of said present time slot to be non-reserved, and (e-6) time slot assigning means for producing said time slot assigning signal on the basis of assignment carried out by said time slot determination circuit.

5. An asynchronous transfer mode switching network system as set forth in claim 4, in which said packet buffer identifying means comprise a fourth counter circuit responsive to a synchronous signal for resetting the counting value produced therein and to a system clock signal for incrementing the counting value, and a first decoder circuit coupled to said fourth counter circuit and supplied with said counting value for producing said first identifying signal.

6. An asynchronous transfer mode switching network system asset forth in claim 5, in which said output port identifying means comprises a second decoder circuit supplied with said time slot request signal for producing said second identifying signal.

7. An asynchronous transfer mode switching network system as set forth in claim 6, in which said schedule memory comprises (e-31) a plurality of memory cells arranged in rows and columns, the number of the columns of said memory cells being equal to the total number of said packet buffer units and said output ports for assigning said columns of said memory cells to said packet buffer units and said output ports, respectively, said rows of said memory cells serving as said memory locations, respectively, (e-32) a plurality of bit line pairs respectively coupled to said columns of said memory cells, (e-33) a plurality of column selectors coupled through respective column selecting lines to said columns of said memory cells and responsive to said first and second identifying signals for activating two of said columns of said memory cells, said pieces of combinatorial information being read out from said rows of memory cells upon selecting said two of said columns of said memory cells, (e-34) a plurality of status reporting lines respectively coupled to said rows of said memory cells, (e-35) a plurality of status sensing circuits provided in association with said rows of said memory cells and producing said hit signal or signals on the basis of said pieces of combinatorial information, (e-36) a plurality of word lines respectively coupled to said rows of said memory cells, (e-37) a plurality of word line driving circuits respectively coupled to said word lines and allowing the associated row of said memory cells to produce data paths to said bit line pairs, respectively, when the time slot corresponding to said associated row of said memory cells is assigned said one of said packets and said time slot is designated as said present time slot, and (e-38) a plurality of write-in circuit means respectively coupled to said columns of said memory cells and memorizing said piece of said combinatorial information of said one of said packets to said memory cells incorporated in said row driven by said word line driving circuit.

8. An asynchronous transfer mode switching network system as set forth in claim 7, in which each of said memory cells has a memory loop implemented by first and second inverter circuits, first and second switching transistors coupled between said memory loop and said associated bit lie pair, and a status reporting circuit coupled between the associated status reporting line and a source of first constant voltage for providing a conduction path therebetween depending upon a data bit memorized therein.

9. An asynchronous transfer mode switching network system as set forth in claim 8, in which said status reporting circuit is implemented by a series combination of two field effect transistors gate electrodes of which are respectively coupled to said memory loop and said associated column selecting line.

10. An asynchronous transfer mode switching network system as set forth in claim 9, in which each of said status sensing circuit comprises a precharging transistor coupled between the associated status reporting line and a source of second voltage level, and a first inverter circuit coupled to said status reporting line and producing said hit signal depending upon the voltage level on the status reporting line.

11. An asynchronous transfer mode switching network system as set forth in claim 10, in which each of said write-in circuit means comprises a precharging circuit coupled to the associated bit line pair, and a write-in circuit storing said first or second identifying signal and driving said associated bit line pair for memorizing said first or second identifying signal as said data bit.

12. An asynchronous transfer mode switching network system as set forth in claim 4, in which said time slot determination circuit comprises (e-51) a plurality of exclusive circuits respectively provided in associated with said rows of said memory cells and coupled to said status sensing circuits and to said word line driving circuits, respectively, and (e-52) a third decoder circuit responsive to said standard time signal and designating one of said exclusive circuits which is associated with said row of said memory cells corresponding to said present time slot, said plurality of exclusive circuits being coupled so as to form a relay loop for looking for said earliest time slot.

13. An asynchronous transfer mode switching network system as set forth in claim 12, in which each of said exclusive circuits comprises a storage circuit for memorizing said piece of assigning information, and a control circuit activated with said hit signal fed from said associated status sensing circuit for allowing said storage circuit to store said piece of assigning information, said control circuit further operative to activate the control circuit of the next exclusive circuit upon remaining in an inactive state without any hit signal, said control circuit further being operative to cause said piece of assigning information to be read out from said storage circuit to said associated word line driving circuit for activation thereof when said third decoder circuit designates.

* * * * *